United States Patent
Carey et al.

(10) Patent No.: US 10,877,997 B2
(45) Date of Patent: Dec. 29, 2020

(54) CLUSTERING DATABASE DATA

(71) Applicant: International Business Machines Corporation, Armonk, NY (US)

(72) Inventors: James E. Carey, Rochester, MN (US); Jim C. Chen, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 15/635,451

(22) Filed: Jun. 28, 2017

(65) Prior Publication Data
US 2019/0005107 A1    Jan. 3, 2019

(51) Int. Cl.
*G06F 16/28*    (2019.01)
*G06F 16/22*    (2019.01)

(52) U.S. Cl.
CPC .......... *G06F 16/285* (2019.01); *G06F 16/221* (2019.01); *G06F 16/2282* (2019.01)

(58) Field of Classification Search
CPC .. G06F 16/221; G06F 16/285; G06F 16/2282; G06F 17/30
USPC ........................................................ 707/737
See application file for complete search history.

(56) References Cited

U.S. PATENT DOCUMENTS

| | | | |
|---|---|---|---|
| 6,484,179 B1* | 11/2002 | Roccaforte | G06F 16/30 707/737 |
| 7,640,308 B2 | 12/2009 | Antonoff et al. | |
| 7,743,059 B2 | 6/2010 | Chan et al. | |
| 7,809,718 B2 | 10/2010 | Brinker et al. | |
| 7,860,866 B2 | 12/2010 | Kim et al. | |
| 9,043,321 B2 | 5/2015 | Bonanni et al. | |
| 9,058,614 B2 | 6/2015 | Safovich et al. | |
| 9,449,005 B2 | 9/2016 | Chen et al. | |
| 9,529,912 B2 | 12/2016 | Liu et al. | |
| 2004/0181519 A1* | 9/2004 | Anwar | G06F 16/283 |
| 2005/0198247 A1* | 9/2005 | Perry | H04L 7/0008 709/223 |
| 2008/0080737 A1 | 4/2008 | Rhoads et al. | |
| 2008/0208855 A1* | 8/2008 | Lingenfelder | G06F 16/283 |
| 2008/0243817 A1* | 10/2008 | Chan | G06Q 30/02 |
| 2009/0106310 A1* | 4/2009 | Lanza | G06F 40/18 |
| 2011/0258240 A1* | 10/2011 | LeFever | G06F 16/30 707/812 |
| 2012/0124478 A1 | 5/2012 | King et al. | |

(Continued)

OTHER PUBLICATIONS

IBM Knowledge Center, "Hidden Columns," [Accessed Online Apr. 19, 2017] https://www.ibm.com/support/knowledgecenter/SSEPGG_10.1.0/com.ibm.db2.luw.admin.dbobj.doc/doc/c0059345.html.

(Continued)

*Primary Examiner* — Hicham Skhoun
(74) *Attorney, Agent, or Firm* — Patterson + Sheridan, LLP

(57) ABSTRACT

Systems, methods, and computer program products to perform an operation comprising receiving, by a database management system (DBMS), a first query specifying to insert data into a database, generating, by a first clustering algorithm applied to a first portion of the data, a first clustering value for the first portion of the data, and storing the data and the first clustering value as a record in a table of the database, wherein the first clustering value is stored in a first hidden column configured to store clustering values in the table.

20 Claims, 8 Drawing Sheets

(56) References Cited

U.S. PATENT DOCUMENTS

| | | | |
|---|---|---|---|
| 2013/0006990 A1* | 1/2013 | Bonanni | G06F 16/35 |
| | | | 707/737 |
| 2015/0039912 A1* | 2/2015 | Payton | H04L 9/008 |
| | | | 713/193 |
| 2015/0095345 A1* | 4/2015 | Arai | G06F 16/2228 |
| | | | 707/744 |
| 2016/0019287 A1 | 1/2016 | Oksman et al. | |
| 2016/0127467 A1 | 5/2016 | Mu et al. | |

OTHER PUBLICATIONS

Hafiz, Munawar; "A Collection of Privacy Design Patterns", PLoP'06 ACM Conference On, Article 7, Oct. 21-23, 2006, pp. 1-13.
Barbosa et al.; "Organizing Hidden-Web Databases by Clustering Visible Web Documents", ICDE IEEE 23rd International Conference On, Apr. 15-20, 2007, pp. 326-335.

* cited by examiner

200

| KEY VALUE 201 | NAME 202 | CLUSTERING VALUE (HIDDEN) 203 |
|---|---|---|
| 1 | APPLE | FRUIT |
| 2 | ORANGE | FRUIT |
| 3 | BROCCOLI | VEGETABLE |
| 4 | WHEAT | GRAIN |
| 5 | CARROT | VEGETABLE |
| 6 | GRAPES | FRUIT |
| ... | ... | ... |
| N | CUCUMBER | VEGETABLE |

| KEY VALUE 201 | CLUSTERING VALUE 203 |
|---|---|
| 1 | FRUIT |
| 2 | FRUIT |
| 3 | VEGETABLE |
| 4 | GRAIN |
| 5 | VEGETABLE |
| 6 | FRUIT |
| N | VEGETABLE |

*FIG. 2B*

>INSERT INTO FOOD (NAME) VALUES (KLE) WHERE CLUSTERINGALGORITHMVALUE=FOOD

ERROR! THE FOOD CLUSTERING ALGORITHM COULD NOT CLUSTER THE PROVIDED VALUE

PLEASE ENTER THE NEW VALUE: [KALE] 302
[SUBMIT] 304

CLUSTER TOOL SETTINGS

CLUSTERING ALGORITHMS: [K-MEANS] 311
NUMBER OF CLUSTER: [10] 312
CLUSTER THRESHOLD: [100 RECORDS] 313
OBJECT TO CLUSTER: [TABLE XYZ] 314
TIME INTERVAL: [DAILY AT 5:00 AM] 315

CLUSTERING DATABASE DATA

BACKGROUND

The present disclosure relates to computer databases, and more specifically, to clustering database data.

Clustering algorithms categorize input data into groups based on similarities between the input data. Databases are organized collections of data. Storing data that logically belongs together in close physical proximity can greatly reduce the amount of processing performed by a database management system, and lead to better compression ratios when the database data is clustered. Therefore, it would be advantageous to extend clustering techniques to database data.

SUMMARY

In one embodiment, a method comprises receiving, by a database management system (DBMS), a first query specifying to insert data into a database, generating, by a first clustering algorithm applied to a first portion of the data, a first clustering value for the first portion of the data, and storing the data and the first clustering value as a record in a table of the database, wherein the first clustering value is stored in a first hidden column configured to store clustering values in the table.

In another embodiment, a system comprises a processor and a memory storing instructions, which when executed by the processor, performs an operation receiving, by a database management system (DBMS), a first query specifying to insert data into a database, generating, by a first clustering algorithm applied to a first portion of the data, a first clustering value for the first portion of the data, and storing the data and the first clustering value as a record in a table of the database, wherein the first clustering value is stored in a first hidden column configured to store clustering values in the table.

In another embodiment, a computer-readable storage medium has computer-readable program code embodied therewith, the computer-readable program code executable by a processor to perform an operation receiving, by a database management system (DBMS), a first query specifying to insert data into a database, generating, by a first clustering algorithm applied to a first portion of the data, a first clustering value for the first portion of the data, and storing the data and the first clustering value as a record in a table of the database, wherein the first clustering value is stored in a first hidden column configured to store clustering values in the table.

BRIEF DESCRIPTION OF THE SEVERAL VIEWS OF THE DRAWINGS

FIGS. 2A-2C depict example techniques for clustering database data, according to various embodiments.

FIGS. 3A-3B depict example graphical user interfaces for clustering database data, according to various embodiments.

DETAILED DESCRIPTION

Embodiments disclosed herein provide techniques to cluster database data. Generally, embodiments disclosed herein cluster data using one or more clustering algorithms when the data is inserted into a database. The data inserted into the database is associated with an indication of one or more data clusters to which the inserted data belongs. The indication of the may be stored, for example, in a hidden column and/or an index structure. Doing so allows users to specify clustering fields when subsequently accessing the database. For example, to select data for all engineers in a company from an employee table for all employees, an example query may specify to "select * from table employees where clustervalue=engineer".

Embodiments disclosed herein may cluster one or more data records as the data is inserted into the database. For example, for high-traffic database systems, an administrator may specify to cluster and insert 10,000 records at a time, while for lower-traffic systems, the administrator may specify to cluster each data record as the record is inserted into the database. Additionally and/or alternatively, the data records may be clustered based on timing windows, where for example, data records are clustered and inserted every 5 minutes. As another example, data records submitted by a given user and/or application may be clustered together.

In some embodiments, the database management system (DBMS) restricts insertion of input data into the database when a clustering algorithm does not produce a cluster value for the input data that is one of a plurality of pre-approved cluster values. In such embodiments, the DBMS may return an indication as to why the data was not inserted, allowing the user to modify the data before attempting to insert the data again. However, in other embodiments, instead of restricting insertion of the input data, the DBMS produces a return code specifying that a new cluster was created for the input data. In such embodiments, the input data is inserted into the database along with an indication that the input data belongs to the new cluster. In at least one embodiment, the DBMS defines the new cluster as one of the plurality of pre-approved cluster values.

Furthermore, embodiments disclosed herein may re-cluster the database data based on periodic timing intervals (e.g., daily, weekly, etc.). The re-clustering may be based on user input which specifies which clustering algorithms to apply, how many clusters of data to create, threshold counts of clustered values to form a cluster (e.g., a minimum of 5 data records form a cluster).

Further still, embodiments disclosed herein extend clustering to distributed databases. For example, each node storing data for the distributed database may be configured to store data which belongs to a specific cluster (or specific clusters). In such embodiments, a given data record is stored on the node which hosts the data cluster to which the data record belongs.

Figure 1:
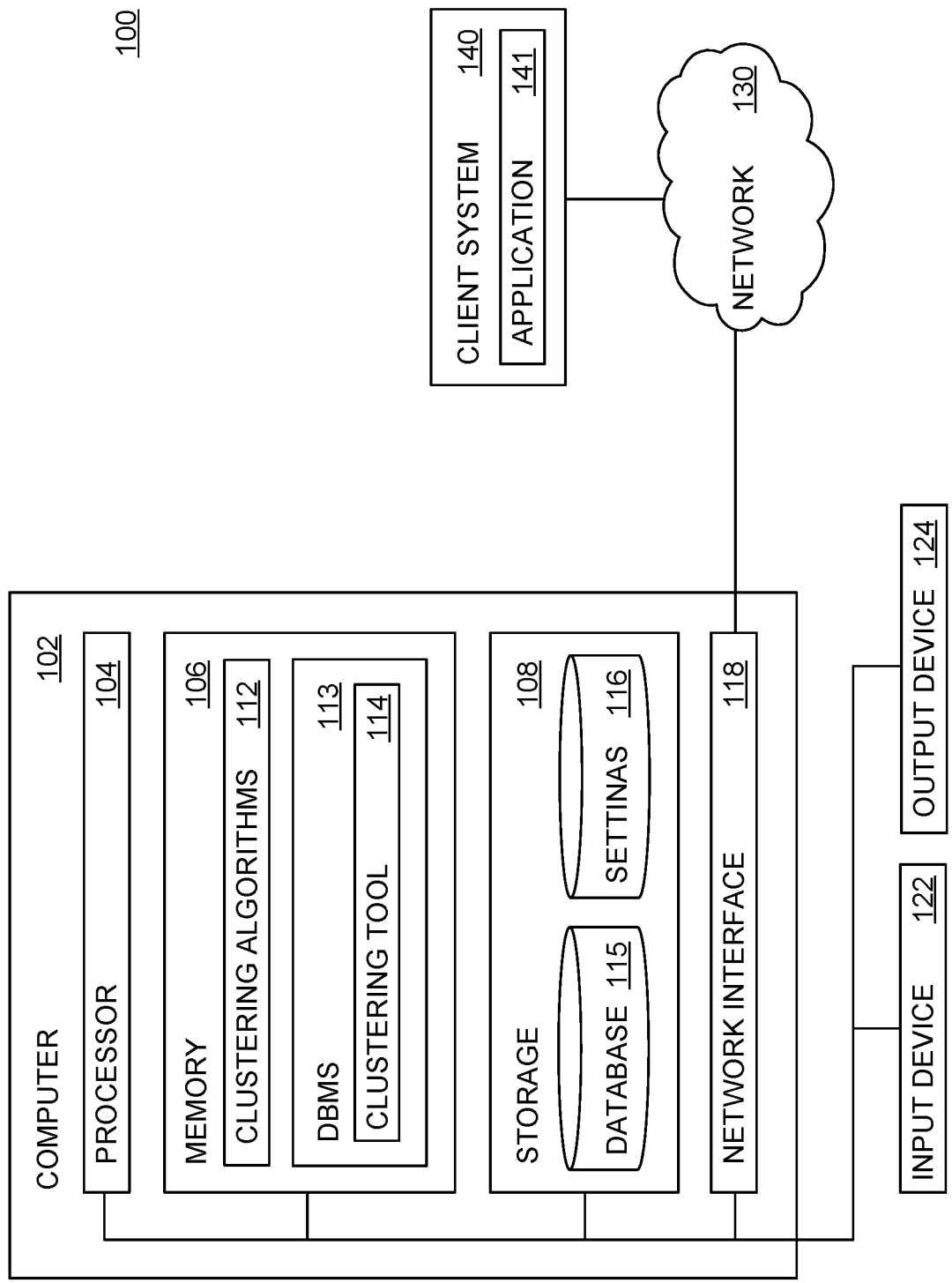
FIG. 1 illustrates an example system which clusters database data, according to one embodiment.

FIG. 1 illustrates an example system 100 which clusters database data, according to one embodiment. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 which obtains instructions and data via a bus 120 from a memory 106 and/or a storage 108. The computer 102 may also include one or more network interface devices 118, input devices 122, and output devices 124 connected to the bus 120. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory physically located elsewhere; for example, on another computer coupled to the computer 102 via the bus 120.

The input device 122 may be any device for providing input to the computer 102. For example, a keyboard and/or a mouse may be used. The input device 122 represents a wide variety of input devices, including keyboards, mice, controllers, and so on. Furthermore, the input device 122 may include a set of buttons, switches or other physical device mechanisms for controlling the computer 102. The output device 124 may include output devices such as monitors, touch screen displays, and so on.

As shown, the memory 106 contains a plurality of clustering algorithms 112 and a database management system (DBMS) 113 which includes a clustering tool 114. Generally, each of the clustering algorithms 112 groups a set of objects (e.g., data) such that objects in a given cluster are more similar to each other than to those in other clusters. Each clustering algorithm 112 produces a clustering value (or label) based on a given element of input data. For example, a clustering algorithm 112 that clusters images based on the most frequently occurring color in the image would produce a color (e.g., blue, green, yellow, etc.) as the clustering value for each image provided as input. The clustering algorithms 112 are representative of any type of clustering algorithm, which may operate on any type of input data (e.g., images, documents, text, etc.). Examples of clustering algorithms include, without limitation, the k-means algorithm and the density-based spatial clustering of applications with noise (DBSCAN) algorithm.

The DBMS 113 generally configured to create, maintain, and manage databases, such as the database 115 of the storage 108. The clustering tool 114 is a component of the DBMS 113 which facilitates clustering of data stored in the database 115 (and/or other databases). Generally, when the DBMS 113 receives a data record for insertion in the database 115 (e.g., from an application 141 executing on the client system 140), the clustering tool 114 applies at least one of the clustering algorithms 112 to at least a portion of the received data record. The values produced by the selected clustering algorithms 112 are then associated with the received data record (e.g., in a hidden column of a table of the database 115 and/or an index data structure of the database 115). Therefore, continuing with the image color example, if the clustering algorithm 112 produces a clustering value of "blue" for an input image, the clustering tool 113 stores the clustering value of "blue" in the hidden column for the image and/or associates an index value of the image and the clustering value of "blue" in an index of the database 115. Doing so allows users and/or applications 141 to specify clustering fields when subsequently accessing the database 115. For example, to select all images having blue as the primary color, an example query may specify to "select * from table images where clustervalue=blue".

The clustering tool 114 may cluster data based on one or more settings for clustering in the settings 116. In at least one embodiment, the data stored in the settings 116 is stored as metadata of the database 115 (e.g., in a database schema). Generally, the settings 116 may include mappings between clustering parameters and objects in the database 115. For example, a first table in the database 115 may be associated with the k-means clustering algorithm, while a second table in the database 115 is associated with the DBSCAN clustering algorithm. Similarly, the settings 116 may associate a first clustering algorithm 112 with a first column of a table (e.g., an address column of a customer table), while associating a second clustering algorithm with a second column of the table (e.g., a zip code column of the customer table). The settings 116 may also include metadata specifying whether a given column is a hidden column.

Furthermore, the settings 116 may also control the timing and amount of data to cluster. Generally, the clustering tool 114 may cluster one or more records at a time. For example, to improve system performance, an administrator may specify in the settings 116 to cluster and insert 10,000 records at a time into the database 115, rather than clustering and inserting each record as it is received. In such embodiments, the clustering tool 114 clusters groups of 10,000 data records, and inserts the clustered 10,000 records into the database 115. As another example, the clustering tool 114 may employ sliding windows for clustering groups of data records. For example, the clustering tool 114 may cluster a group of 10,000 data records (e.g., records 0-9,999), then slide 5,000 data records, and cluster the next group of 10,000 records (e.g., records 4,999-14-999), and so on. Additionally and/or alternatively, the clustering tool 114 clusters data records based on time, where for example, data records are clustered and inserted every 5 minutes (even if only 9,000 of the requisite 10,000 records have been received). Again, the clustering tool 114 may apply sliding time windows when clustering based on time. For example, the clustering tool 114 may cluster 5 minutes of received data records (e.g., 0-5 minutes), then slide 2.5 minutes, and clustering 5 minutes of data records (e.g., 2.5-7.5 minutes), and so on. Similarly, the clustering tool 114 may cluster data records based on the user and/or application 141 submitting the data records.

In at least one embodiment, the clustering tool 114 restricts insertion of data into the database 115 when a clustering algorithm 112 does not produce a cluster value for the input data that is one of a plurality of pre-approved cluster values in the settings 116 (e.g., a plurality of defined clustering values for colors, such as red, green, blue, yellow, etc.). In such embodiments, the clustering tool 114 returns an indication as to why the data was not inserted in the database 115, allowing the user to modify the data before attempting to insert the data again. However, in other embodiments, instead of restricting insertion of the input data, the clustering tool 114 produces a return code specifying that a new cluster (e.g., a cluster for the color purple) was created. In at least one embodiment, the clustering tool 114 defines the new cluster as one of the plurality of pre-approved cluster values in the settings 116. Furthermore, a user may specify, in the settings 116, whether or not to restrict insertion of data when the clustering algorithm 112 does not produce a pre-approved cluster value.

Furthermore, the clustering tool 114 may periodically re-cluster the data in the database 115 (e.g., daily, weekly, etc.). The clustering tool 114 may perform the re-clustering according to user input which specifies which clustering algorithms to apply, what data in the database 115 to cluster (e.g., tables, indexes, columns, etc.), how many clusters of data to create, threshold counts of clustered values to form a cluster (e.g., a minimum of 5 data records form a cluster), and the like. In at least one embodiment, when clustering or re-clustering the database 115, the clustering tool 114 deletes (or archives) records for which a clustering algorithm 112 does not produce a clustering value that is a member of one of the predefined clustering values (which may be stored in the settings 116). Stated differently, the clustering tool 114 deletes (or archives) records that do not belong to one or more predefined clusters. However, in other embodiments, the clustering tool 114 may output an indication (e.g., via the GUI 301) for a user to correct the values of records, such that the clustering algorithm 112 can produce an acceptable clustering value. Once the acceptable clustering value is generated, the clustering tool 114 may maintain an association between the corrected values and an application which created the previous value.

Furthermore, after several iterations of clustering and/or re-clustering, the clustering tool 114 may modify the pre-defined clustering values. For example, after several iterations, the clustering tool 114 may determine that the clustering value "purple" has only one associated image, which may be below a predefined threshold. In such embodiments, the clustering tool 114 may remove the clustering value of "purple" from the predefined clustering values.

Generally, the clustering tool 114 may cluster any component of the database 115, such as database tables, columns in the tables, database indexes, and the like. Furthermore, the clustering tool 114 is configured to receive input specifying the components that should be clustered against. For example, an insert query may specify to cluster based on an employee name using a specific clustering algorithm 112. Further still, the clustering tool 114 may cluster based on data that is related to the data in the database 115. For example, in social media platforms, users may post different types of content, such as text, images, videos, and any combination thereof. The content posted by the user is then stored in a database. However, other users often make comments on the posted content, which may not be stored in the same database as the posted content. However, the clustering tool 114 is able to cluster the posted content in the database 115 based on the comments. For example, the clustering tool 114 can cluster posted content in the database 115 based on a sentiment of the commenters, where the sentiment is produced by one or more of the clustering algorithms 112. In such an example, the cluster values may correspond to user sentiment such as "agreed", "disagreed", "liked", "approved", which is based on the text of the comments rather than the posted content.

FIG. 2A illustrates an example table 200 from the database 215 which has been clustered, according to one embodiment. As shown, the table 200 includes a key value column 201, a name column 202 of food names, and a hidden clustering value column 203. Generally, when a record of data is received by the DBMS 113, the clustering tool 114 applies at least one clustering algorithm 112 to the food name to produce a clustering value 203 which corresponds to a cluster the food belongs to (e.g., fruits, vegetables, etc.). For example, as shown, the apple in column 202 is assigned a clustering value 203 of "fruit", while broccoli in column 202 is assigned a clustering value 203 of "vegetable." In addition to the clustering value 203, any other type and number of clustering values may be applied to each row of data, such that a given record is associated with multiple clustering values. In such embodiments, a hidden column is provided to store each respective clustering value.

Generally, a hidden column is defined by a "hidden" attribute, which makes the hidden column unavailable unless data from the hidden column is explicitly requested. Therefore, if a "select" query is applied to the table 200, the DBMS 113 does not return the clustering values 203 unless the query explicitly specifies to return data from the clustering value column 203.

FIG. 2B depicts an index 204 which stores clustering information, according to one embodiment. As shown, the index 204 includes the key value column 201 and the clustering value 203. Doing so may provide faster access to the cluster values rather than accessing the table 200. For example, as shown, the key value 5 (which corresponds to the "carrot" of table 200) is associated with a clustering value of "vegetable".

Once the clustering tool 114 associates data records with a clustering value 203 (in the table 200 and/or the index 204), the database data may be accessed based at least in part on the clustering values 203. For example, a query may specify to select the food names from table 200 where the clustering value 203 equals "fruit". Doing so would return the apple, orange, and grapes records as results. When data records have multiple clustering values, each clustering value associated with a respective clustering algorithm 112 which produced the clustering value, the query may specify desired clustering values for each algorithm. For example, a query may specify to "select * from table XYZ where clusteringkmeans=value", where "clusteringkmeans" is a k-means clustering algorithm 112, and "value" corresponds to a value produced by the k-means clustering algorithm 112. Similarly, if the table XYZ is also clustered based on a second clustering algorithm 112, the query may specify to "select * from table XYZ where secondclustering=value" where "value" corresponds to a value produced by the second clustering algorithm 112.

Figure 2C:
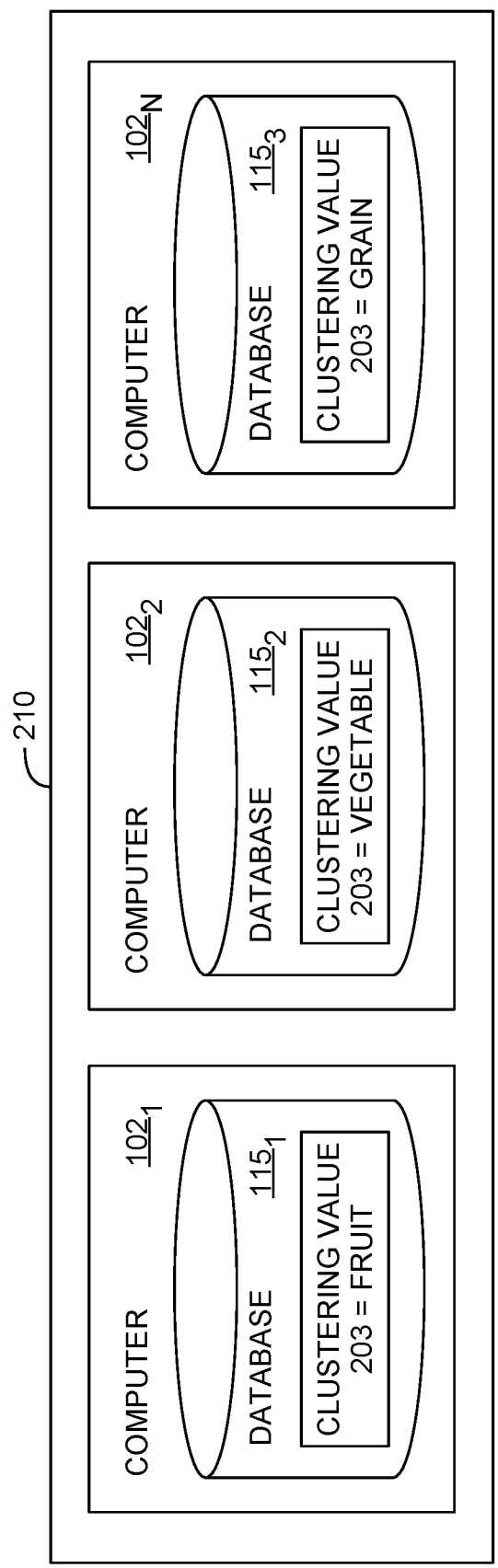

FIG. 2C illustrates an example distributed database system 210 which clusters database data. As shown, the distributed database system 210 includes three example computers 102 of FIG. 1, namely computers $102_{1,2,N}$. As shown, each computer $102_{1,2,N}$ hosts at least a portion (also referred to as shards) of the database 115, namely portions $115_{1,2,3}$, respectively. As shown, however, the clustering tool 114 has clustered the distributed database such that each of the computers $102_{1,2,N}$ stores data records that belong to one (or more clusters). For example, as shown, the computer $102_1$ stores all records from table 200 of database 115 having a clustering value 203 of "fruit", while computer $102_2$ stores all records from table 200 having a clustering value 203 of "vegetable", and computer $102_N$ stores all records from table 200 having a clustering value 203 of "grain". Doing so keeps the related clusters of data records on the same compute host, improving performance of the distributed database system 210.

FIG. 3A depicts an example graphical user interface (GUI) 300 for clustering database data, according to various embodiments. As shown, the GUI 300 allows a user to specify a query targeting the database 115. Specifically, as shown, the user has typed an example query specifying to "insert into food (name) values (kle) where clusteringalgorithmvalue=food". Generally, the user is attempting to enter a new food into the food table 200 using an example clustering algorithm 112 that outputs food categories. However, as shown, the user made a typographical error when spelling "kale", and the clustering algorithm 112 was unable to cluster the provided value of "kle" into one of the predefined clusters. However, as shown, the GUI panel 301 notifies the user of the failed insert, and provides an input field 302 to allow the user to supply a new value for the food. As shown, the user has typed "kale" correctly, which may then be submitted via the submit button 304. Once submitted, the food clustering algorithm 112 would generate a clustering value for "kale" (e.g., "vegetable"), and insert the record into the table 200.

FIG. 3B depicts a GUI 310 which allows a user to specify example settings for re-clustering operations periodically performed by the clustering tool 114. As shown, the GUI 310 allows the user to specify one or more clustering algorithms in the input field 311, a desired number of clusters in the input field 312, a cluster threshold of a count of records required to establish a cluster in input field 313, an object to cluster in the input field 314, and a time interval by which the clustering tool 114 performs the re-clustering operation. As shown, the user has specified to apply a k-means clustering algorithm to table XYZ daily at 5:00 a.m. The user has further specified to create 10 clusters (or clustering values), a threshold of 100 records for each cluster. Although only one clustering algorithm is shown for the sake of clarity, the GUI 310 may allow the user to define any number of clustering algorithms 112 for the clustering tool 114 to apply to the database data.

Figure 4:
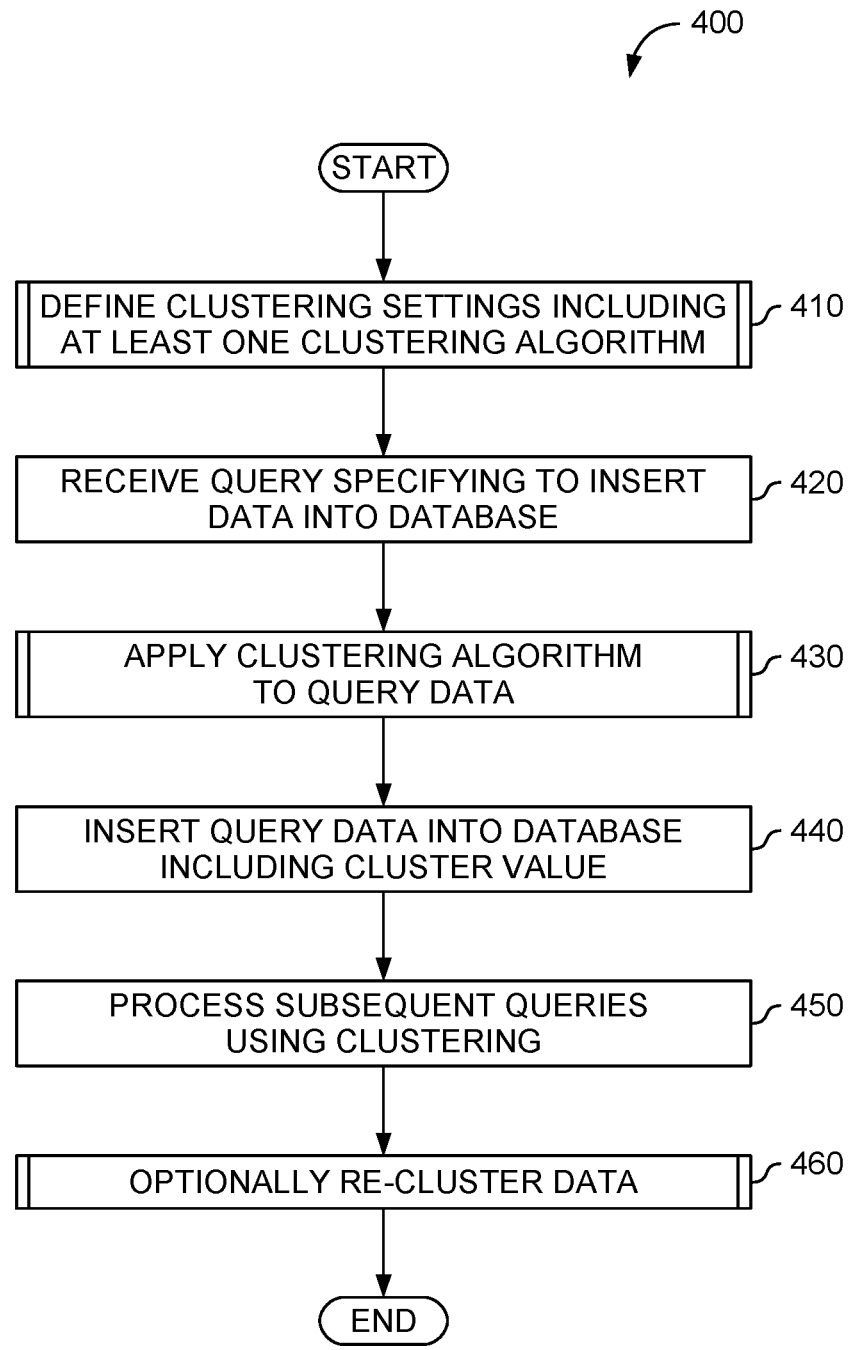
FIG. 4 is a flow chart illustrating an example method to cluster database data, according to one embodiment.

FIG. 4 is a flow chart illustrating an example method 400 to cluster database data, according to one embodiment. As shown, the method 40 begins at block 410, described in greater detail with reference to FIG. 5, where a user optionally defines one or more settings 116 for clustering data in the database 115. The settings 116 may include at least one clustering algorithm 112, a target data structure (e.g., a table, column, index) in the database 115, a number of clusters, and the like. At block 420, the DBMS 113 receives a query specifying to insert data in the database 115. At block 430, described in greater detail with reference to FIG. 6, the clustering tool 114 applies at least one clustering algorithm 112 to the data received at block 420. Doing so produces a clustering value, which is associated with the query data received at block 420.

At block 440, the clustering tool 114 and/or the DBMS 113 inserts the query data received at block 440 into the database 115 with an indication of the cluster value generated by the clustering algorithm 112. As previously indicated, the cluster value may be included in a hidden column of the corresponding table, and/or stored in a clustering index. At block 450, the clustering tool 114 and/or the DBMS 113 process subsequent queries using clustering. For example, select queries may specify to select data from the database 115 where the data is associated with a specified clustering value. Additionally, whenever a user or application attempts to insert data, the clustering tool 114 applies the requisite clustering algorithm 112 to the data based on the settings defined at block 410. At block 460, described in greater detail with reference to FIG. 7, the clustering tool 114 optionally re-clusters the data in the database 115 according to periodic timing intervals.

Figure 5:
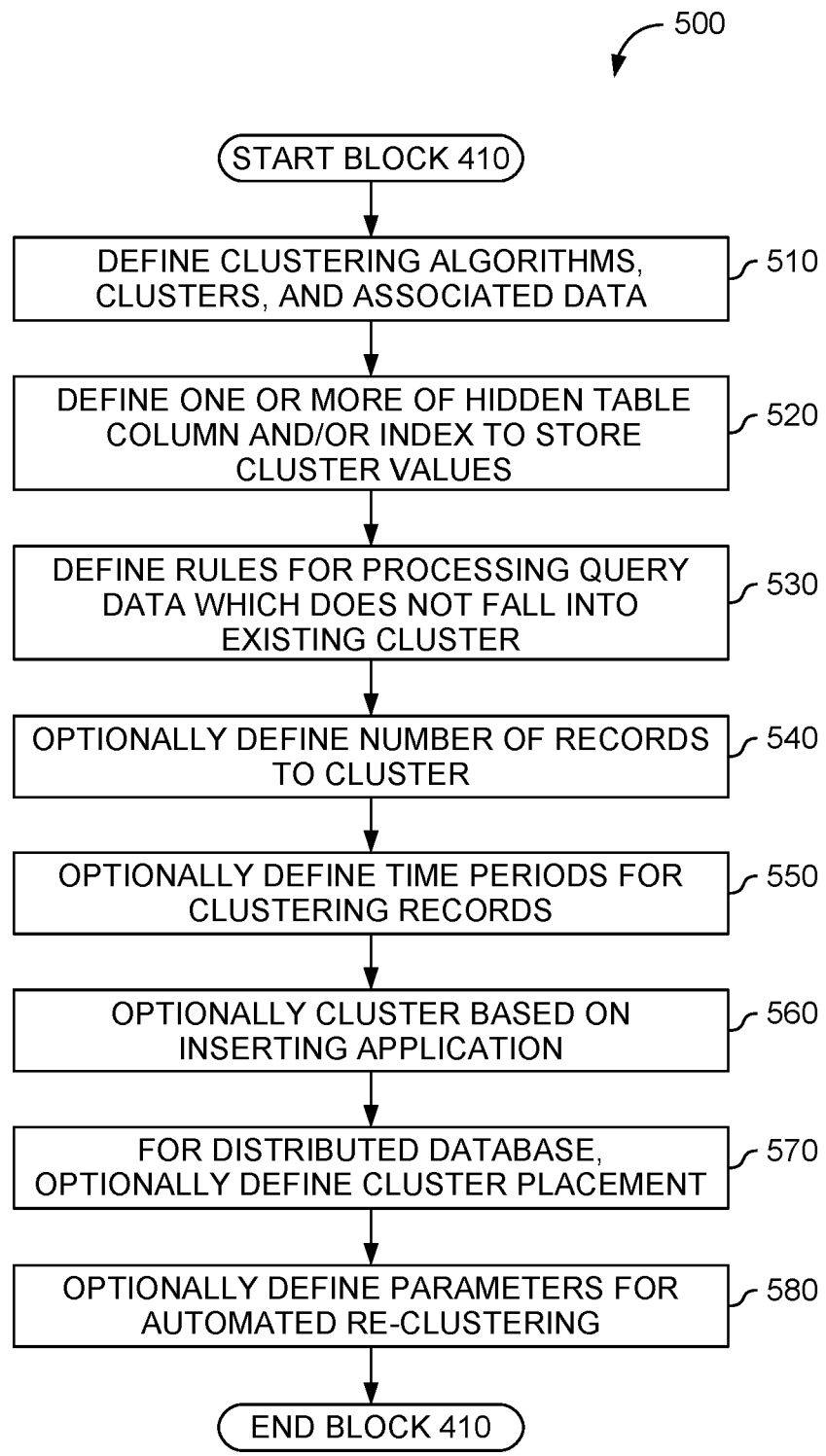
FIG. 5 is a flow chart illustrating an example method to define clustering settings, according to one embodiment.

FIG. 5 is a flow chart illustrating an example method 500 corresponding to block 410 to define clustering settings, according to one embodiment. As shown, the method 500 begins at block 510, where the user specifies one or more clustering algorithms 112, one or more clustering values, and the data which the clustering algorithms 112 receive as input. For example, a table storing documents may be associated with a k-means clustering algorithm 112, where the documents are the input provided to the k-means clustering algorithm 112. At block 520, the user optionally defines a hidden table column for each respective clustering algorithm 112 defined at block 510. Additionally and/or alternatively, the user may define one or more database indexes which store the clustering data. At block 530, the user defines one or rules in the settings 116 for processing query data which, when processed by the clustering algorithms 112, does not fall into any clustering values defined at block 510. The rules may specify, for example, to prompt the user to modify the query data, reject the query and delete the data, and/or reject the query and archive the data. For example, if the user defines 5 different clustering values at block 510, and the associated clustering algorithm 112 produces a value for query data which does not fall into one of the 5 clustering values, the clustering tool 114 may prompt the user to correct the query data.

At block 540, the user optionally defines a number of records to cluster at a given time. For example, the user may specify to cluster 1,000 records at a time, and shift in 500 record intervals. At block 550, the user optionally defines time periods for clustering records, such as clustering all data records every minute, with a 30 second shift after each minute. At block 560, the user may specify rules for clustering based on the application which inserts data. Doing so allows the clustering tool 114 to cluster data generated by each application independently. At block 570, the user optionally defines cluster placement for distributed databases. For example, if 100 clusters of data exist, the user may determine to place 4 different clusters of data on each of 25 different storage nodes. At block 580, the user optionally defines the parameters for the re-clustering operation periodically performed by the clustering tool 114. Examples of re-clustering parameters include time intervals to re-cluster, the data to re-cluster, the clustering algorithms used, and the like.

Figure 6:
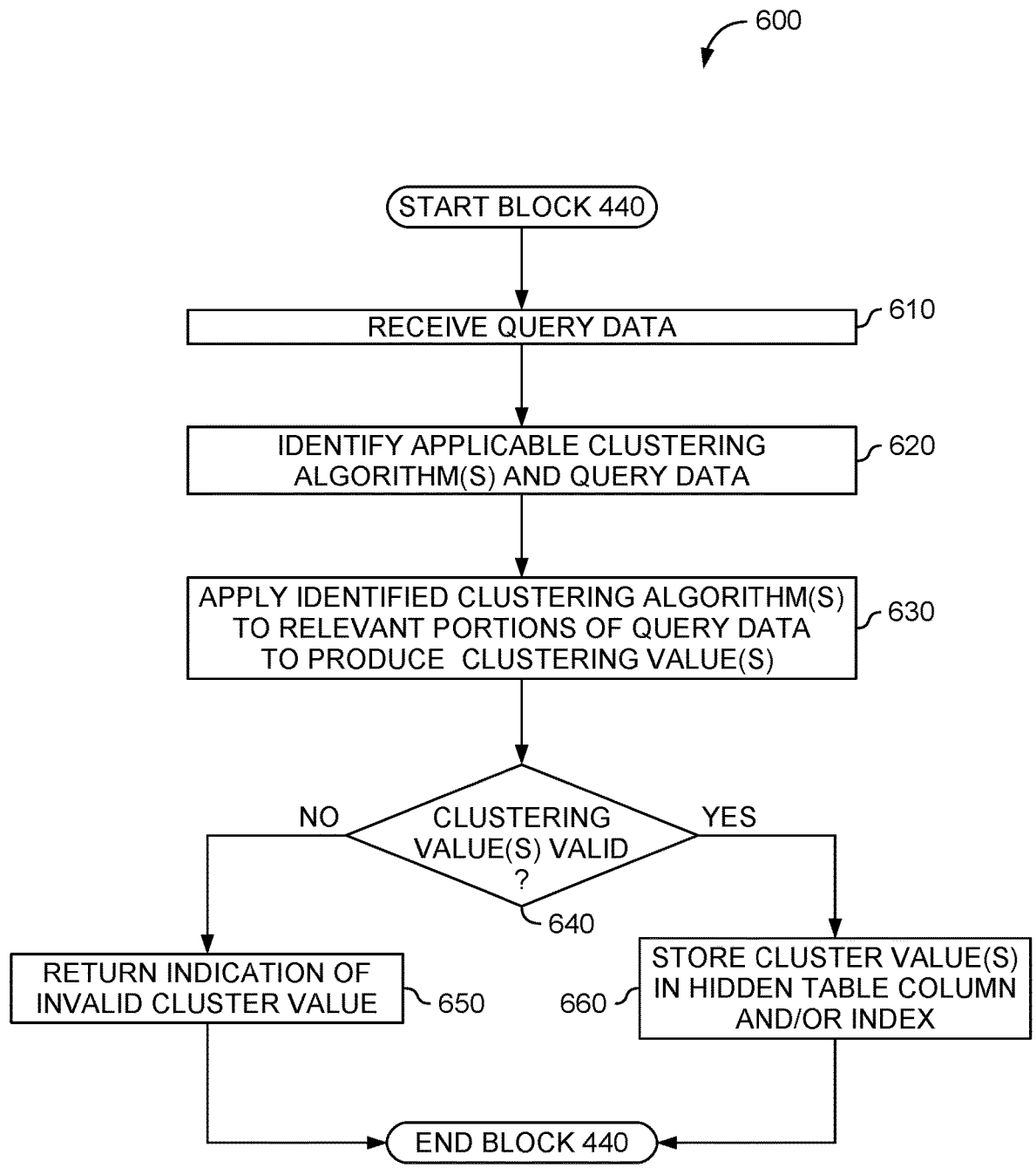
FIG. 6 is a flow chart illustrating an example method to apply a clustering algorithm to query data, according to one embodiment.

FIG. 6 is a flow chart illustrating an example method 600 corresponding to block 440 to apply a clustering algorithm to query data, according to one embodiment. As shown, the method 600 begins at block 610, where the clustering tool 114 receives at least one record of query data. At block 620, the clustering tool 114 identifies the applicable clustering algorithms 112 and query data provided as input to the clustering algorithms 112. For example, the query may specify to apply k-means clustering to a particular value in the query. As another example, the settings 116 and/or metadata in the DBMS 113 may associate clustering algorithms 112 with columns, tables, and/or indexes in the database 115. At block 630, the clustering tool 114 applies the identified clustering algorithms 112 to the relevant portions of the query data to produce one or more clustering values.

At block 640, the clustering tool 114 determines whether the clustering value(s) generated at block 630 are valid (e.g., are one of the predefined clustering values). If at least one clustering value is not valid, at block 650 the clustering tool 114 returns an indication that the query data resulted in an invalid clustering value, and that the query data was not inserted into the database. If each of the clustering values generated at block 630 are valid, the clustering tool 114 and/or the DBMS 113 stores the generated clustering values in a respective hidden column and/or index.

Figure 7:
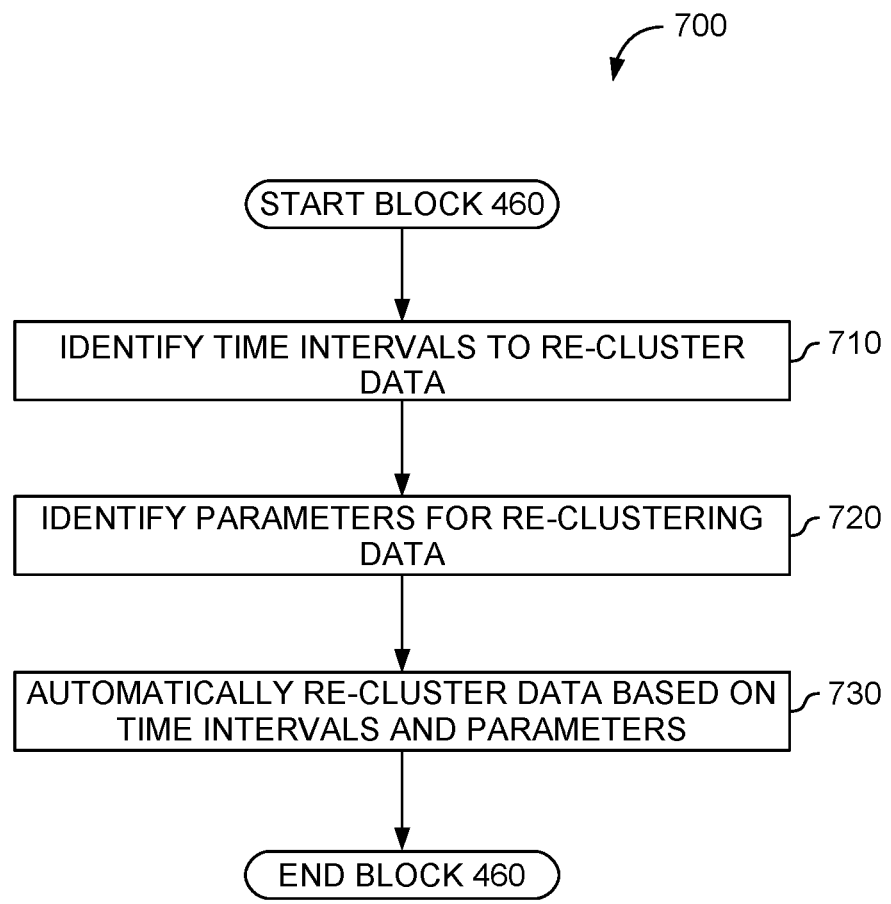
FIG. 7 is a flow chart illustrating an example method to re-cluster data in a database, according to one embodiment.

FIG. 7 is a flow chart illustrating an example method 700 corresponding to block to re-cluster data in a database, according to one embodiment. As shown, the method 700 begins at block 710, where the clustering tool 114 identifies any applicable time intervals (e.g., every Saturday at 3:00 a.m.) for re-clustering data. At block 720, the clustering tool 114 identifies any parameters in the settings 116 for re-clustering data (e.g., applicable clustering algorithms 112, data provided as input to the clustering algorithms 112, etc.). At block 730, the clustering tool 114 automatically re-clusters the database data based on the time intervals and parameters for re-clustering data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the clustering tool 114 could execute on a computing system in the cloud. In such a case, the clustering tool 114 may store clustered database data at storage locations in the cloud. Doing so allows users to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, by a database management system (DBMS), a first query specifying to insert data into a database;
   generating, by a first clustering algorithm applied to a first portion of the data in the first query, a first clustering value for the first portion of the data;
   storing the data in the first query and the first clustering value as a record in a table of the database, wherein the first clustering value is stored in a first hidden column configured to store clustering values in the table;
   generating, for a first portion of data in a second query, a second clustering value; and
   upon determining that the second clustering value is not one of a plurality of approved values, restricting insertion of the data in the second query into the database.

2. The method of claim 1, wherein the first clustering algorithm is of a plurality of clustering algorithms, wherein the first portion of the data targets a first column of the table, the method further comprising:
   generating, by a second clustering algorithm of the plurality of clustering algorithms applied to a second portion of the data of the first query, a third clustering value for the second portion of the data, wherein the second portion of the data targets a second column of the table, wherein the third clustering value is stored in a second hidden column in the table.

3. The method of claim 1, further comprising:
   receiving a modified value for the first portion of the data of the second query;
   generating, by the first clustering algorithm applied to the modified value, a third clustering value for the modified value;
   determining that the third clustering value is one of the plurality of approved clustering values; and
   storing the data of the second query and the third clustering value as a respective record in the table of the database, wherein the third clustering value is stored in the first hidden column in the table.

4. The method of claim 1, wherein the database comprises a distributed database, wherein the distributed database is stored on a plurality of nodes, wherein each node is configured to store data records from the table specifying a respective one of the approved clustering values in the first hidden column.

5. The method of claim 1, further comprising:
   storing a key value associated with the record and the clustering value as an entry in an index of the database.

6. The method of claim 1, wherein the clustering value is generated and the data is stored in the table upon determining at least one of: (i) a predefined number of queries specifying to insert data into the database have been received, (ii) a predefined amount of time has elapsed, (iii) a predefined time for clustering has occurred.

7. The method of claim 1, further comprising:
receiving a third query specifying to return data records from the table having the first clustering value; and
processing the third query by returning each data record in the table having the first clustering value in the first hidden column of the table.

8. A computer program product, comprising:
a computer-readable storage medium having computer readable program code embodied therewith, the computer readable program code executable by a processor to perform an operation comprising:
receiving, by a database management system (DBMS), a first query specifying to insert data into a database;
generating, by a first clustering algorithm applied to a first portion of the data in the first query, a first clustering value for the first portion of the data;
storing the data in the first query and the first clustering value as a record in a table of the database, wherein the first clustering value is stored in a first hidden column configured to store clustering values in the table;
generating, for a first portion of data in a second query, a second clustering value; and
upon determining that the second clustering value is not one of a plurality of approved values, restricting insertion of the data in the second query into the database.

9. The computer program product of claim 8, wherein the first clustering algorithm is of a plurality of clustering algorithms, wherein the first portion of the data targets a first column of the table, the operation further comprising:
generating, by a second clustering algorithm of the plurality of clustering algorithms applied to a second portion of the data of the first query, a third clustering value for the second portion of the data, wherein the second portion of the data targets a second column of the table, wherein the third clustering value is stored in a second hidden column in the table.

10. The computer program product of claim 8, the operation further comprising:
receiving a modified value for the first portion of the data of the second query;
generating, by the first clustering algorithm applied to the modified value, a third clustering value for the modified value;
determining that the third clustering value is one of the plurality of approved clustering values; and
storing the data of the second query and the third clustering value as a respective record in the table of the database, wherein the third clustering value is stored in the first hidden column in the table.

11. The computer program product of claim 8, wherein the database comprises a distributed database, wherein the distributed database is stored on a plurality of nodes, wherein each node is configured to store data records from the table specifying a respective one of the approved clustering values in the first hidden column.

12. The computer program product of claim 8, the operation further comprising:
storing a key value associated with the record and the clustering value as an entry in an index of the database.

13. The computer program product of claim 8, wherein the clustering value is generated and the data is stored in the table upon determining at least one of: (i) a predefined number of queries specifying to insert data into the database have been received, (ii) a predefined amount of time has elapsed, (iii) a predefined time for clustering has occurred.

14. The computer program product of claim 8, the operation further comprising:
receiving a third query specifying to return data records from the table having the first clustering value; and
processing the third query by returning each data record in the table having the first clustering value in the first hidden column of the table.

15. A system, comprising:
a processor; and
a memory storing one or more instructions which, when executed by the processor, performs an operation comprising:
receiving, by a database management system (DBMS), a first query specifying to insert data into a database;
generating, by a first clustering algorithm applied to a first portion of the data in the first query, a first clustering value for the first portion of the data; and
storing the data in the first query and the first clustering value as a record in a table of the database, wherein the first clustering value is stored in a first hidden column configured to store clustering values in the table;
generating, for a first portion of data in a second query, a second clustering value; and
upon determining that the second clustering value is not one of a plurality of approved values, restricting insertion of the data in the second query into the database.

16. The system of claim 15, wherein the first clustering algorithm is of a plurality of clustering algorithms, wherein the first portion of the data targets a first column of the table, the operation further comprising:
generating, by a second clustering algorithm of the plurality of clustering algorithms applied to a second portion of the data of the first query, a third clustering value for the second portion of the data, wherein the second portion of the data targets a second column of the table, wherein the third clustering value is stored in a second hidden column in the table.

17. The system of claim 15, the operation further comprising:
receiving a modified value for the first portion of the data of the second query;
generating, by the first clustering algorithm applied to the modified value, a third clustering value for the modified value;
determining that the third clustering value is one of the plurality of approved clustering values; and
storing the data of the second query and the third clustering value as a respective record in the table of the database, wherein the third clustering value is stored in the first hidden column in the table.

18. The system of claim 15, wherein the database comprises a distributed database, wherein the distributed database is stored on a plurality of nodes, wherein each node is configured to store data records from the table specifying a respective one of the approved clustering values in the first hidden column.

19. The system of claim 15, the operation further comprising:
storing a key value associated with the record and the clustering value as an entry in an index of the database.

20. The system of claim 15, wherein the clustering value is generated and the data is stored in the table upon determining at least one of: (i) a predefined number of queries specifying to insert data into the database have been received, (ii) a predefined amount of time has elapsed, (iii) a predefined time for clustering has occurred, the operation further comprising:

receiving a third query specifying to return data records from the table having the first clustering value; and processing the third query by returning each data record in the table having the first clustering value in the first hidden column of the table.

\* \* \* \* \*